United States Patent [19]

Yamada

[11] Patent Number: 4,899,227
[45] Date of Patent: Feb. 6, 1990

[54] IMAGE PROCESSING APPARATUS DETECTING THE SIZE OR POSITION OF AN INFORMATION PORTION OF AN ORIGINAL

[75] Inventor: Masanori Yamada, Kawasaki, Japan

[73] Assignee: Canon Kabushiki Kaisha, Tokyo, Japan

[21] Appl. No.: 147,357

[22] Filed: Jan. 21, 1988

[30] Foreign Application Priority Data

Jan. 26, 1987 [JP] Japan .................................. 62-17054
Mar. 12, 1987 [JP] Japan .................................. 62-57361

[51] Int. Cl.$^4$ ...................... H04N 1/393; H04N 1/387; H04N 1/40
[52] U.S. Cl. ...................................... 358/452; 358/449; 358/451; 358/453
[58] Field of Search ................. 358/77, 280, 282, 284, 358/287, 443, 448, 449, 451, 452, 453; H04N/1/21, 1/38, 1/387, 1/393, 1/40

[56] References Cited

U.S. PATENT DOCUMENTS

| | | | |
|---|---|---|---|
| 4,439,790 | 3/1984 | Yoshida | 358/449 |
| 4,623,935 | 11/1986 | Mukai et al. | 358/280 |
| 4,686,577 | 8/1987 | Arimoto | 358/449 |
| 4,701,805 | 10/1987 | Maeshima | 358/280 |
| 4,835,618 | 5/1989 | Shimizu | 358/287 |

FOREIGN PATENT DOCUMENTS

| | | | |
|---|---|---|---|
| 61-169082 | 7/1986 | Japan | H04N 1/387 |
| 61-232775 | 10/1986 | Japan | H04N 1/40 |
| 62-1370 | 1/1987 | Japan | H04N 1/40 |

Primary Examiner—James J. Groody
Assistant Examiner—Randall S. Svihla
Attorney, Agent, or Firm—Fitzpatrick, Cella, Harper & Scinto

[57] ABSTRACT

An image processing apparatus capable of detecting (1) the size or position of the original on the table, and/or (2) the size or position of an information portion of the original. The apparatus includes an original supporting table for supporting an original. The original has an information portion and a non-information portion. Reading apparatus is provided for reading an area of the table including the original placed on the table, and for generating image data corresponding to the read area and the read original. First detector circuitry is included for detecting the position or size of the original on the table based on the image data from the reading apparatus. Second detector circuitry is included for detecting the position or the size of the information portion of the original based on the image data from the reading apparatus.

9 Claims, 16 Drawing Sheets

FIG. 17
(1) 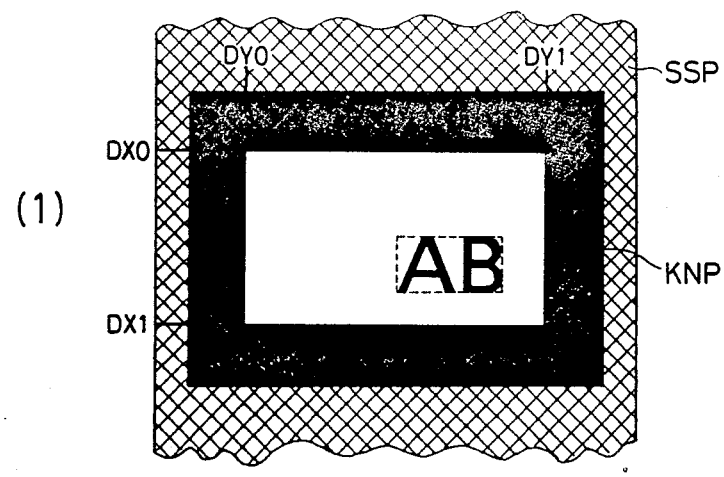
(2) 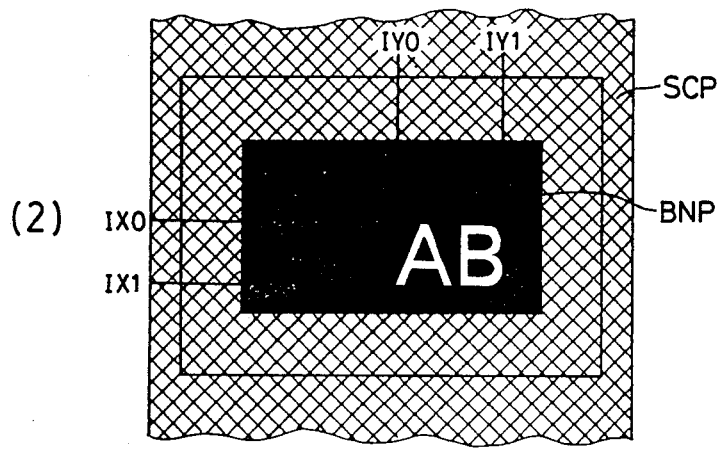

IMAGE PROCESSING APPARATUS DETECTING THE SIZE OR POSITION OF AN INFORMATION PORTION OF AN ORIGINAL

BACKGROUND OF THE INVENTION

1. Field of the Invention

The present invention relates to an image processing apparatus for processing an original image, adapted for use in a copying machine, a facsimile apparatus or the like.

2. Related Background Art

Image processing apparatus for photoelectrically reading an original image to obtain an image signal and thus electrically processing the original image have been proposed by the present applicant for example in U.S. Pat. Application No. 06/942,035, filed Dec. 15, 1986, now U.S. Pat. No. 4,835,618, which is a continuation of Application No. 06/876,659, filed June 18, 1986, now abandoned, which is a continuation of Application No. 06/537,424, filed Sept. 29, 1983, now abandoned; U.S. Pat. Application No. 07/220,936, filed June 23, 1988, which is a continuation of Application No. 07/106,892, filed Oct. 9, 1987, now abandoned, which is a continuation of Application No. 06/946,093, filed Dec. 23, 1986, now abandoned, which is a continuation of Application No. 06/539,461, filed Oct. 6, 1983, now abandoned; U.S. Pat. Application No. 06/339,282, filed Jan. 13, 1982, now U.S. Pat. 4,439,790; and U.S. Pat. Application No. 06/677,096, filed Nov. 30, 1984, now U.S. Pat. 4,686,577.

Such apparatus are capable of functions such as image enlargement, image reduction, extraction of a partial image and erasure thereof.

There are also known other image processing functions such as an image moving mode in which the original image is moved to the center or a predetermined position of a sheet by recognizing the size and position of the original; a function of automatically selecting an optimum sheet size; and a function of automatically varying the image size according to the selected sheet size. However, these functions are in fact conducted for the entire original document, and, if the original contains a large unnecessary white area or if the information is not located at the center, the area outside the information portion is inevitably wasted. Consequently it has been necessary for the operator to designate a desired information area for example with a digitizer or with numeral keys.

SUMMARY OF THE INVENTION

In consideration of the foregoing, an object of the present invention is to provide an image processing apparatus capable of recognizing an information portion in the original.

Another object of the present invention is to provide an image processing apparatus capable not only of processing for the entire original but also of processing the information part in the original with simple operations.

Still another object of the present invention is to provide an image processing apparatus capable of processings image data corresponding to an information portion in the original.

The foregoing and still other objects of the present invention, and the advantages thereof, will become fully apparent from the following description.

BRIEF DESCRIPTION OF THE DRAWINGS

FIG. 17 is a schematic view showing the state of image at the coordinate detection.

DETAILED DESCRIPTION OF THE PREFERRED EMBODIMENTS

Now the present invention will be clarified in detail by preferred embodiments thereof.

Figure 1:
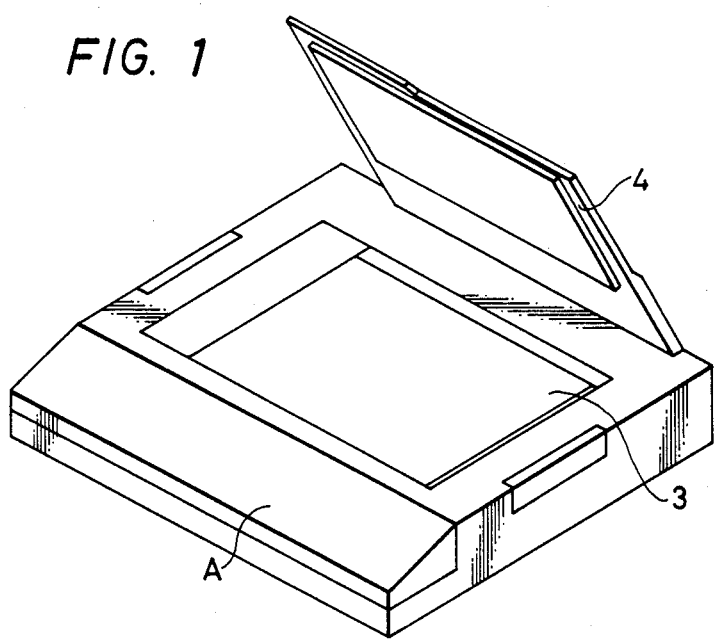
FIG. 1 is a perspective view of a reader unit.
Figure 2:
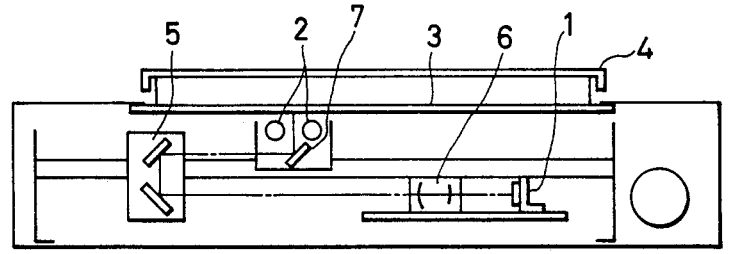
FIG. 2 is a cross-sectional view thereof.

FIG. 1 is an external view of an original reader unit embodying the present invention, and FIG. 2 is a cross-sectional view thereof.

An original document is placed, with the information bearing face thereof downwards, on an original supporting glass plate 3, and is pressed thereto by an original cover 4, having a mirror-finished face on the surface close to said glass, for the purpose of original detection as will be explained later. The original document is illuminated by a fluorescent lamp 2, and the reflected light is guided by mirrors 5, 7 and a lens 6 and focused on a line image sensor CCD1.

The mirrors 7 and 5 are moved with a relative speed ratio of 2 : 1. The above-explained optical system is moved at a constant speed by a DC servo motor under phase-locked loop control, whereby the image on the entire original document is read line by line with the line image sensor CCD1.

If this original reader unit can handle an original of A3 size at maximum, with a resolving power of 400 dots/inch, the CCD1 is required to have $297/25.4 \times 400 = 4678$ bits. Consequently, the present embodiment employs a CCD of 5000 bits having a linear array of about 5000 photoelectric converting elements.

Also if the main scanning period is 352.9 μsec ($=10^{6/180} \times 25.4/400$), the optical system composed of the mirror 7 and the lamp 2 moves with a speed of 180 mm/sec in case of a same size reproducing mode.

Figure 3:
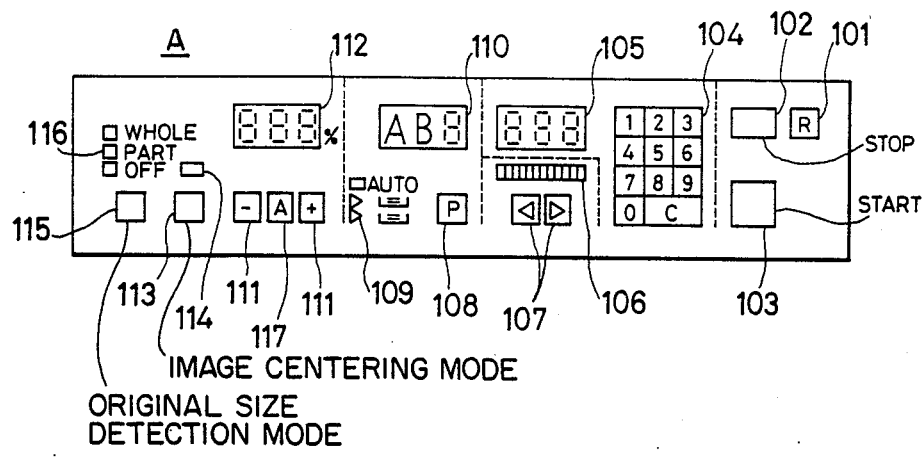
FIG. 3 is a schematic view of an operation unit.

FIG. 3 shows an operation unit of the reader, indicated by A in FIG. 1.

There are provided a standard mode key 101 for restoring a standard process mode; a stop key 102 for interrupting the process; a start key 103 for starting a process; numeral keys 104 for entering the number of copies; a display device 105 for indicating the number of copies; an indicator 106 of the density; and a density up/down key 107.

A sheet size selection key 108 cyclically turns on indicators 109 indicating the upper and lower sheet feeders of the printer and the automatic sheet size selection mode, and a display device 110 indicates the selected sheet size. There are also provided an image magnification up/down key 111; a key 117 for repeatedly selecting an automatic magnification varying mode and a same size mode; and an image magnification display device 112.

A key 113 selects a mode of moving the image to the center of sheet or a mode without image movement, respectively when an indicator 114 is turned on or off.

A key 115 for selecting the original size detection cyclically turns on indicators 116. An indicator OFF indicates the absence of original detecting operation; an indicator PART indicates an editing only on the information area detected in the original by a method to be explained later; and an indicator WHOLE indicates an editing on the entire original sheet detected by a method to be explained later.

Figure 4:
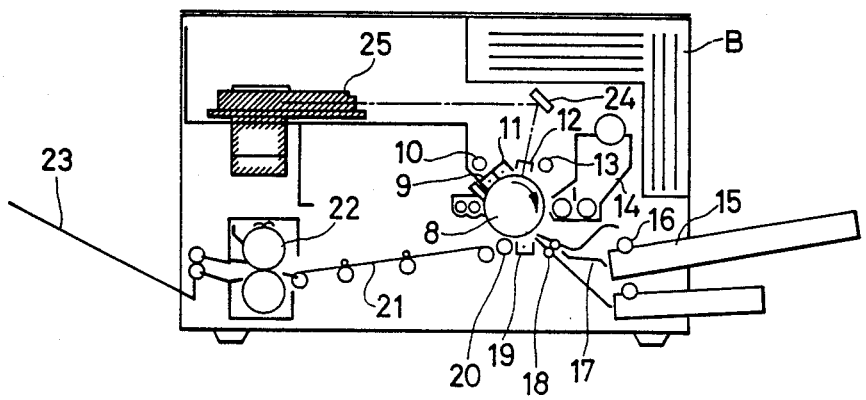
FIG. 4 is a cross-sectional view of a printer unit.

FIG. 4 is a cross-sectional view of the printer unit.

The image signal bit-serially processed in the reader unit is supplied to a laser scanning optical unit 25, composed of a semiconductor laser, a collimating lens, a rotary polygon mirror, an F-$\theta$ lens, and an inclination correcting optical system.

The image signal from the reader unit is subjected to electrooptical conversion in the semiconductor laser. The laser beam from said semiconductor laser is introduced through the collimating lens to the polygon mirror rotated at a high speed, and the light beam reflected therefrom scans a photosensitive member 8. The photosensitive member 8 is associated with process components for image formation, including a charge pre-eliminator 9; a charge pre-eliminating lamp 10; a primary charger 11; a secondary charger 12; a flush exposure lamp 13; a developing unit 14; sheet cassette 15; sheet feeding rollers 16; sheet guide members 17; registration rollers 18; a transfer charger 19; a separating roller 20; a transport guide member 21; a fixing unit 22; and a tray 23. The photosensitive member 8 and the transport system are operated at a speed of 180 mm/sec. Thus the printer B constitutes a so-called laser beam printer.

The copying apparatus of the present embodiment is provided with intelligent image editing functions, such as a function of image size variation with an arbitrary image magnification variable at pitch of 1% within a range from 0.35 times to 4.0 times; a trimming function for extracting the image of a designated area; an image moving function for moving the trimmed image to an arbitrary position on the sheet; and a function of detecting the coordinates of the original placed on an original table and of the information area in said original. These functions will be explained in detail later.

Figure 5:
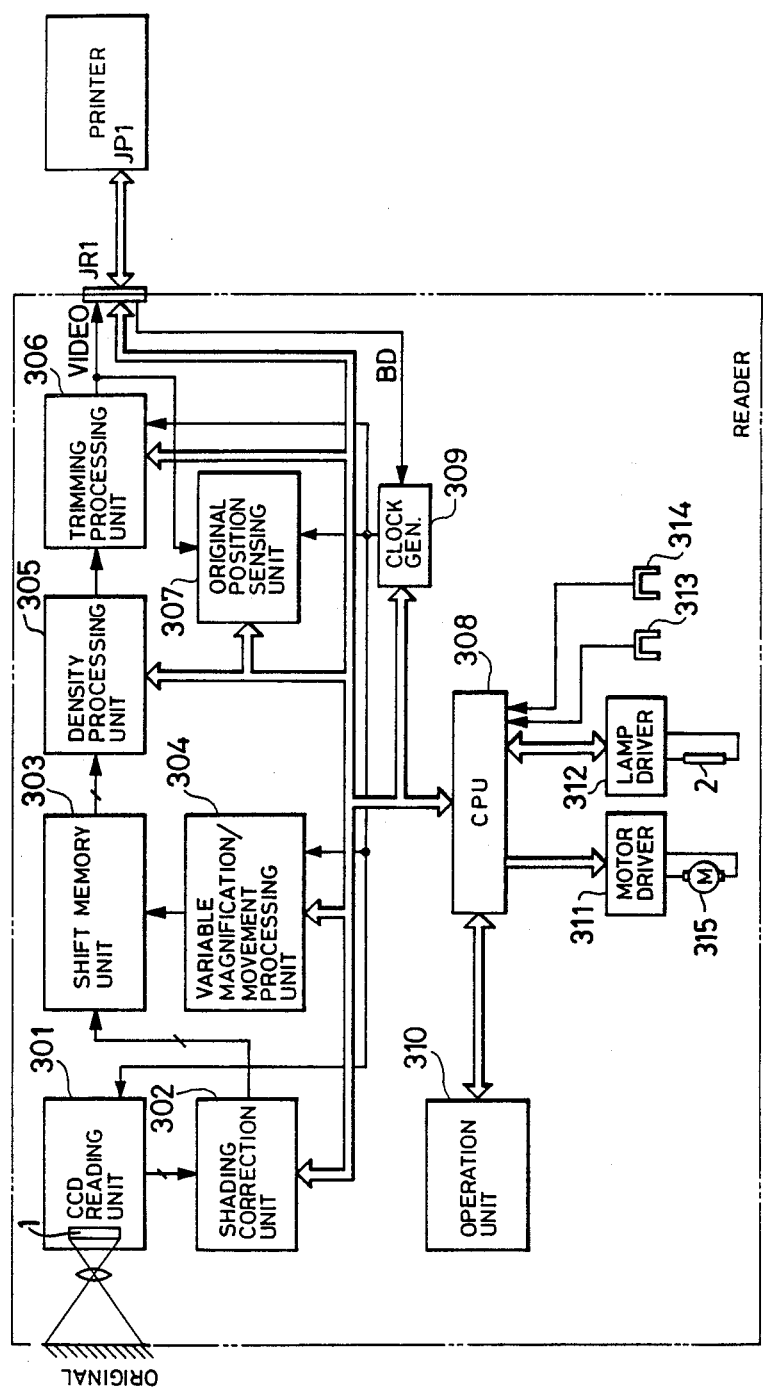
FIG. 5 is a block diagram of the reader unit.

FIG. 5 is a block diagram of the reader unit.

A CCD reading unit 301 is provided with a CCD 1; a clock driver for the CCD 1; a signal amplifier for the signal from the CCD 1; and an A/D converter for A/D conversion of said signal.

The CCD reading unit 301 supplies the image data, converted into a digital signal of 6 bits per pixel, to a shading correction unit 302, which executes detection and removal of the shading components caused by the light source and the lens in the image data. After said correction, the image data are temporarily stored in a shift memory unit 303.

The shift memory unit 303 has two shift memories for two lines, so that, while the image data of the N-th line are stored in the first memory, the image data of the (N−1)-th line are read from the second memory. In addition the shift memory unit 303 is provided with a write address counter for recording the image data in the shift memories; a read address counter for data reading; and an address selector circuit for switching the address signals from said two counters, as shown in more detail in FIG. 6.

A magnification variation/movement process unit 304 executes size variation and movement of the image in the main scanning direction, by varying the clock signal for storage of the image data into the shift memories, the clock signal for reading the image data therefrom, and the timing of said signal reading.

The image data released from the shift memory unit 303 are supplied to a density process unit 305 for a binary digitizing process or a dither process, and the binary signal thus obtained is supplied to a trimming process unit 306, which converts arbitrary sections of the image data in the main scanning line to "0" or "1", thereby enabling image editing.

The binary signal from the trimming process unit 306 is also supplied to an original position sensing unit 307, which detects the coordinates of the original document on the original supporting glass 3 or the information area in said original document, as will be explained later.

A CPU unit 308 is provided with a CPU; a ROM; a RAM, a timer circuit and an I/O interface, and executes control on the operation unit 310, on the reader unit in response to the instructions of the operator entered through the operation unit 310, and on the printer unit through serial communication.

A DC servo motor driver 311 controls the speed of a motor 315 according to speed data corresponding to an image magnification preset by the CPU 308. A fluorescent lamp driver 312 performs on/off control of the fluorescent lamp 2 and regulates the amount of light therefrom. Position sensors 313, 314 are provided for advising the CPU 308 of the position of the optical system composed of the lamp 2 and the mirror 7.

The reader unit is connected with an external unit such as a laser beam printer through a connector JR1 and a connector JP1 of said external unit.

Between the reader unit and the external unit there are exchanged control signals necessary for the communication of image data and the serial communication of commands.

A clock generator 309 generates a transfer clock signal for the CCD, a read/write clock signal for the shift memories etc. in synchronization with a horizontal synchronization signal, which may be composed of a beam detection signal BD synchronized with the image recording operation of each line in the laser beam printer, or may be generated internally.

Figure 6:
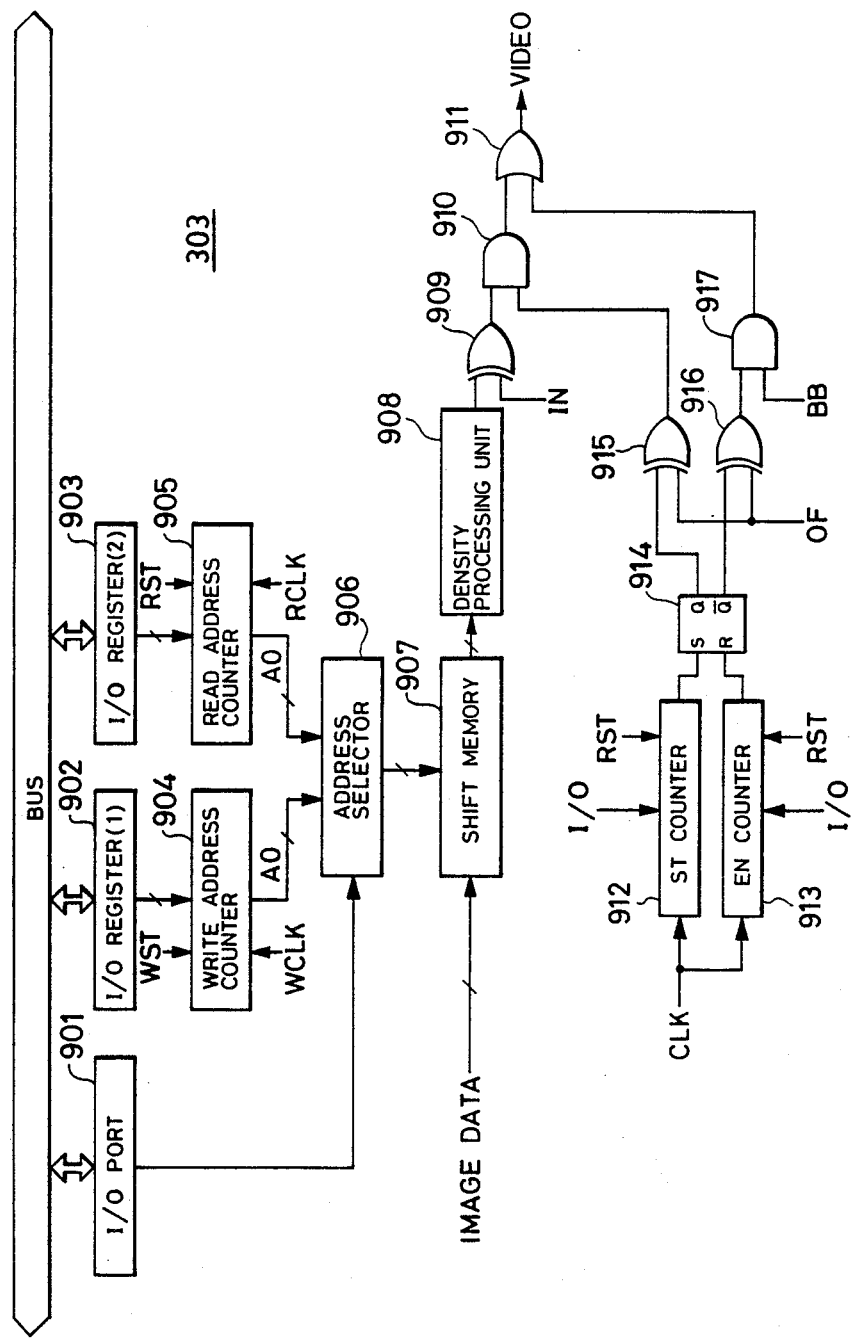
FIG. 6 is a block diagram of a circuit relating to a shift memory.

FIG. 6 is a circuit diagram relating to the shift memory unit 303 shown in FIG. 5.

A write address counter 904 is used for storing data in a shift memory 907, while a read address counter 905 is used for reading data from the shift memory 907. An address selector 906 selects either the address signal from the write address counter 904 or the address signal from the read address counter 905 in response to an instruction received from the CPU 308 through an I/O port 901, thereby designating the address or the shift memory 907.

I/O registers 902, 903 are used for giving preset values, determined by the CPU 308, respectively to the write address counter 904 and the read address counter 905.

The write address counter 904 and the read address counter 905, both composed of down counters, respectively receive signals WST and RST from the CPU 308 for initiating the counting operation, and also respectively receive a write clock signal WCLK for data storage into the shift memory 907 and a read clock signal RCLK for data reading from the shaft memory 907.

Exclusive OR gates 915, 916 are used for determining the image area, and are controlled by a signal OF. In a state "1" of said signal, the interior of a frame determined by a ST-counter 912 and an EN-counter 913 is masked while the exterior of said frame is released as an output image, and in a state "0", the interior of said frame is released as an output image while the exterior is masked.

An AND gate 910 controls the output of the image data released from the shift memory 907 and binarized in the density process unit 908. An AND gate 917 determines whether the above-mentioned masked area is to be released as black or white. A signal BB controls said gate to obtain black release or white release respectively in a state "1" or "0".

An OR gate 911 releases the image output signal from the gates 910, 917 as a VIDEO signal. An exclusive OR gate 909 controls the black-and-white conversion of the image data and is controlled by a signal IN, which provides an output without inversion or an inverted output respectively in a state "1" or "0". The above-mentioned signals are released by the CPU 308 according to the operating mode designated by the operator.

The start bit counter (ST) 912 and the end bit counter (EN) 913 are used for releasing the image only in predetermined areas.

Figure 7:
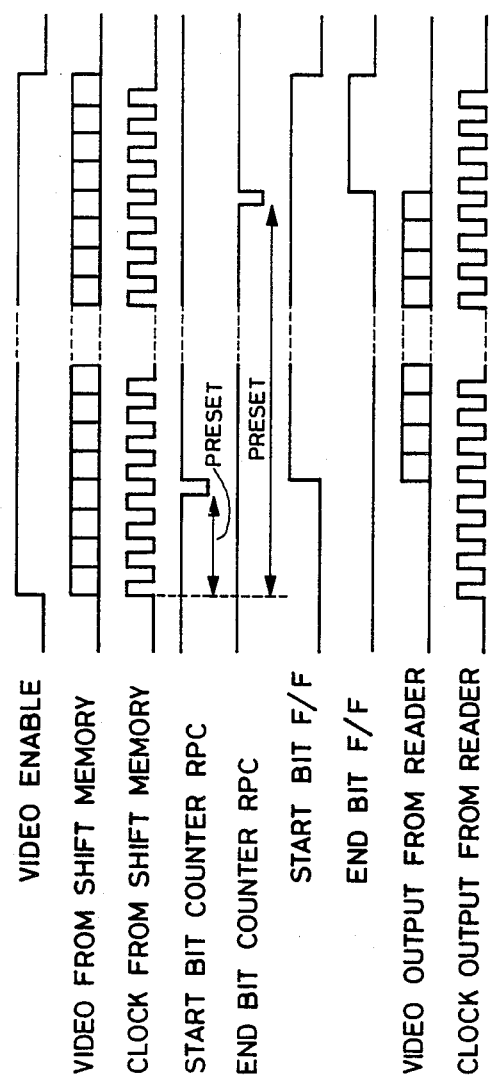
FIG. 7 is a timing chart for trimming control.

Count data for gating are preset in these counters by the CPU 308 through the I/O port. A flip-flop 914 is set at the end of the counting operation of the ST-counter 912, and is reset at the end of the counting operation of the EN-counter 913. FIG. 7 shows an example of the function thereof.

FIG. 7 shows an example of the operation in case the image data inside a frame determined by the ST-counter 912 and the EN-counter 913 (while the exterior of said frame is masked) is white. When the signal OF is at the level "0", the output Q of the flip-flop 914 is shifted to "1" at the end of the counting operation of the ST-counter 912, whereby the gate 915 releases a signal "1". Thus, the gate 910 releases the entered image data until the end of the counting operation of the EN-counter 913. On the other hand, outside the output period of the image data, the gate 916 releases an output signal "1", so that the output of the gate 917 is "0" when the BB signal is "0". Thus, the gate 911 releases a signal "0" constituting a white mask. On the other hand, in case of OF ="0" and BB ="1", the exterior of the frame is masked black.

On the other hand, in case of OF ="1", the gates 915, 916 respectively release signals "0" and "1" during a period from the end of the counting operation of the ST-counter 912 to the end of the counting operation of the EN-counter 913. Consequently the interior of the frame is masked black or white respectively when BB ="1" or "0".

In the following there will be explained the principle of variation of image magnification.

Variation of image magnification in the sub scanning direction is achieved by varying the scanning speed of the optical system. Based upon the image magnification, the CPU 308 calculates the speed of the DC servo motor, determines the phaselocked loop control frequency corresponding to said speed, and presets said frequency in the motor driver 311 in FIG. 5.

Since the sheet transport speed in the printer unit is always 180 mm/sec, the optical system is driven at a speed of 90 mm/sec which is equal to a half of the ordinary speed 180 mm/sec in the equal image size in case of an image enlargement of 2 times, or a doubled speed of 360 mm/sec in case of an image reduction to half.

Figure 8:
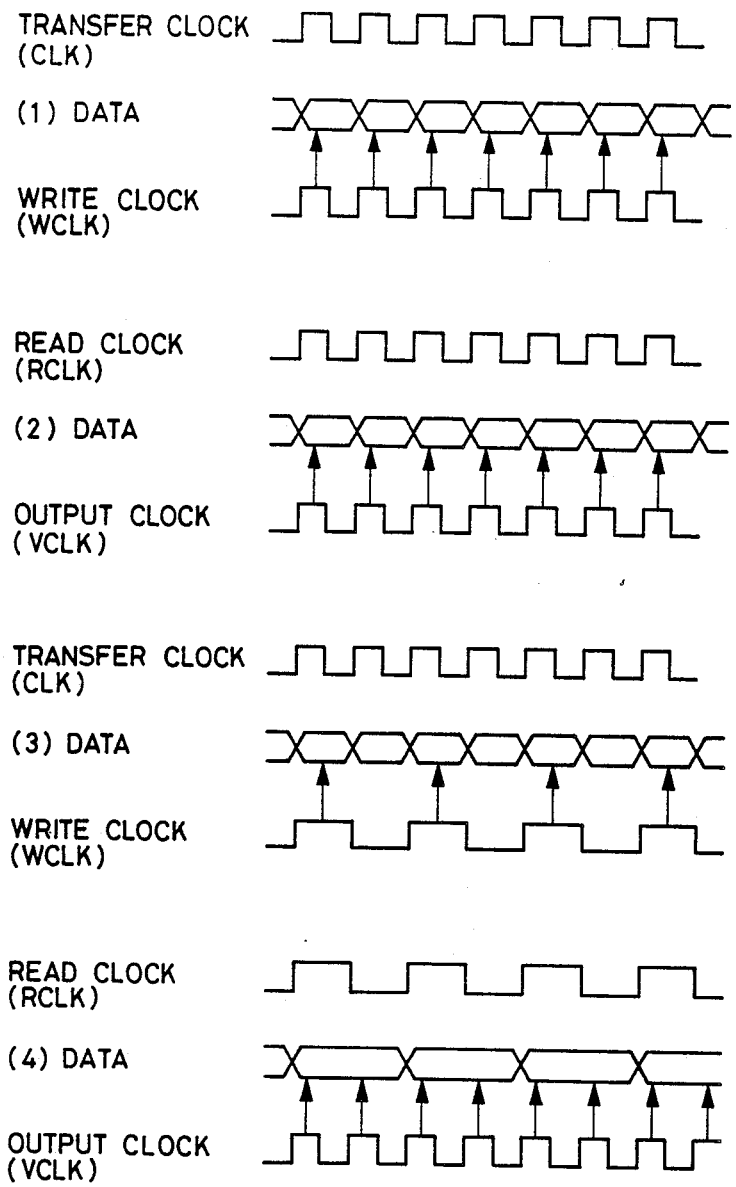
FIG. 8 is a timing chart showing an image size varying operation.

Now reference is made to FIG. 8 for explaining the principle of variation of image magnification in the main scanning direction.

Serial image data of a constant frequency from the CCD 1 are subjected, after A/D conversion, to a sampling with a clock rate corresponding to the image magnification. In case of same size reproduction, the image data are stored in the shift memory with the write clock signal WCLK the same as the transfer clock signal CLK for the CCD 1, as shown in FIG. 8(1), and are read from said shift memory with the read clock signal RCLK the same as an output clock signal VLCK and provides to the printer unit as shown in FIG. 8(2).

In case of image reduction to ½, the frequency of the write clock signal WCLK for data storage in the shift memory is reduced to a half of that of the transfer clock signal CLK as shown in FIG. 8(3), thereby storing every other bit of the original data into the shift memory. The read clock signal RCLK in this case is made the same as the output clock signal VCLK as shown in FIG. 8(2), thereby achieving image reduction by half.

In case of image enlargement of 2 times, the image data are stored as shown in FIG. 8(1), in the same manner as in the same size reproduction, and are read from said shift memory with a clock rate equal to a half of the output clock signal VCLK to the printer unit as shown in FIG. 8(4), whereby every bit of the original data is repeated twice to achieve image enlargement of 2 times.

Figure 9:
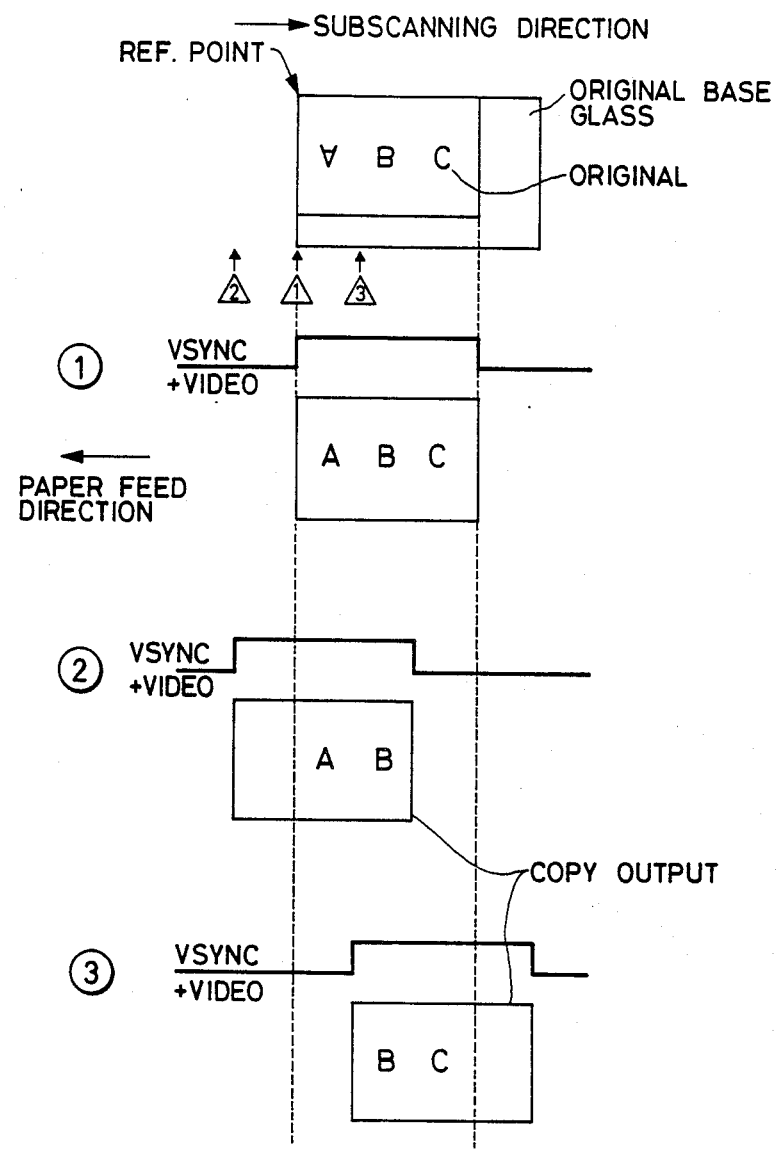
FIGS. 9 and 10 are respectively a schematic view and a timing chart showing an image displacing operation.
Figure 10:
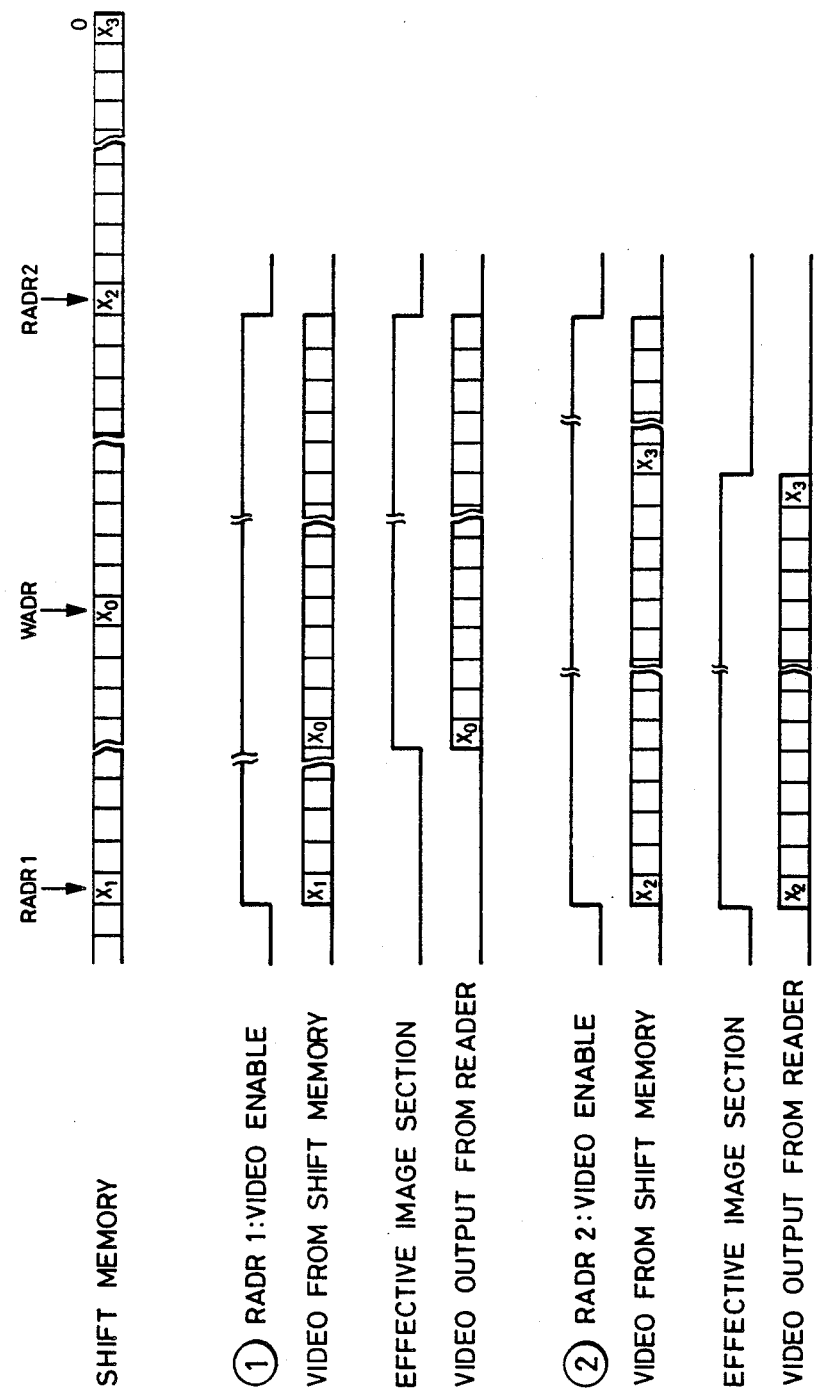

Now reference is made to FIGS. 9 and 10 for explaining the principle of image movement.

The image movement in the sub scanning direction can be achieved, as shown in FIG. 9, by varying the timing of original image scanning and the output timing of the VSYNC signal to the printer unit.

More specifically, an unmoved output as shown in (1) can be obtained by releasing the VIDEO signal together with the VSYNC signal when the optical system reaches a position 1. An output moved backward as shown in (2) can be obtained by releasing said signals when the optical system reaches a position 2, and an output moved forward as shown in (3) can be obtained by releasing said signals when the optical system is at a position 3.

On the other hand, the image movement in the main scanning direction can be achieved, as shown in FIG. 10, by a relative change in the down-count start addresses given to the write address counter 904 and the read address counter 905 through the I/O registers 902, 903 shown in FIG. 6.

For example, as shown in FIG. 10(1), the use of a write start address WADR and a read start address RADR1 for the shift memory causes a movement, to the right, of image data $X_0$ *corresponding to the address WADR with respect to the main scanning output duration signal VIDEO EN-ABLE. Also the use of a write start address RADR2 causes, as shown in FIG. 10(2), a movement to the left of data $X_3$* corresponding to the shift memory address 0, with respect to said VIDEO ENABLE signal. The effective image section signal shown in FIG. 10, indicating the trimming section, is formed by the ST-counter 912, EN-counter 913, flip-flop 914 and gates 915, 916, 917, 910 and 911, and is used for obtaining white signals outside the range from address "0" to address WADR in the shift memory shown in FIG. 10.

Figure 11:
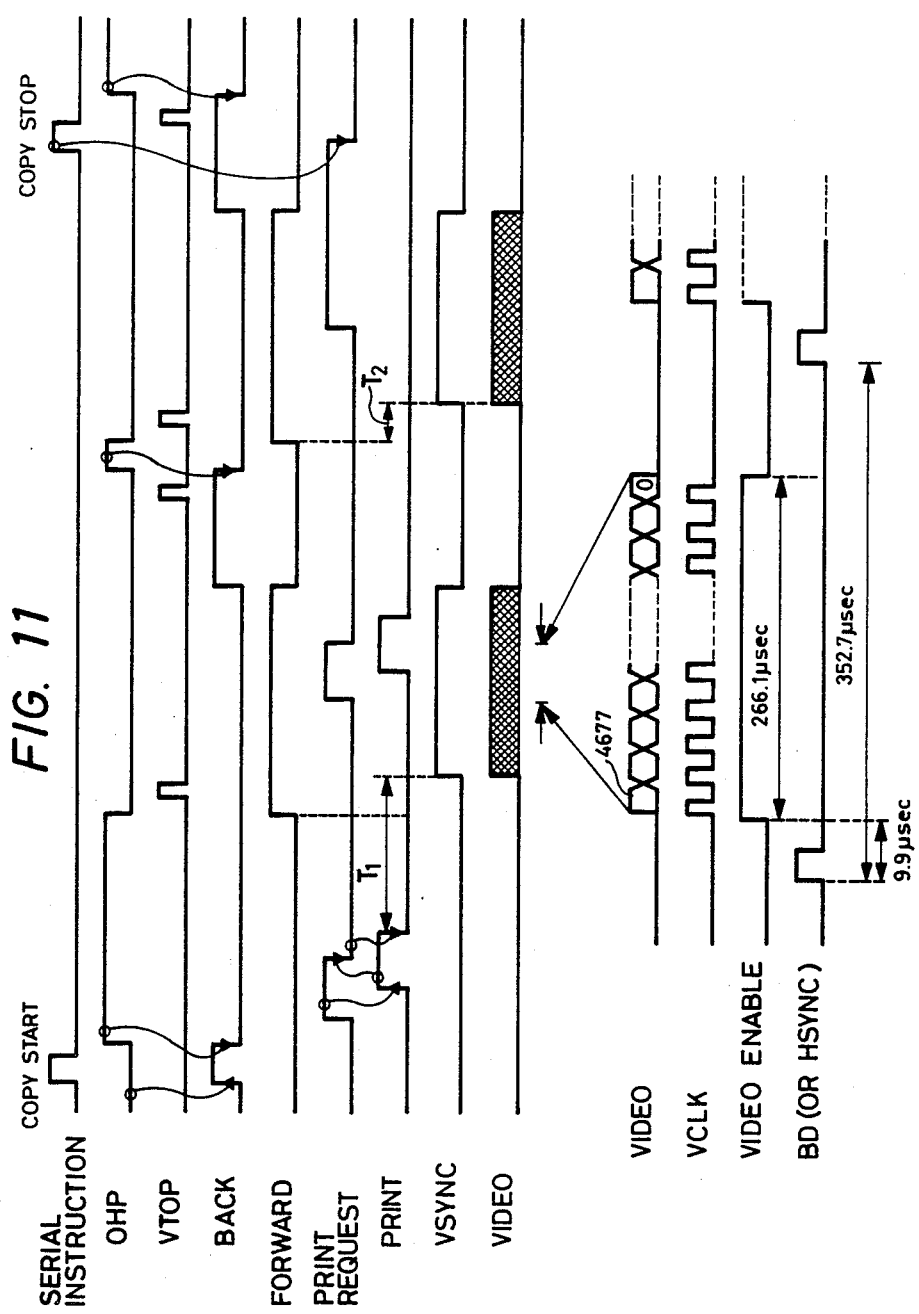
FIGS. 11 and 12 are timing charts of an interface.
Figure 12:
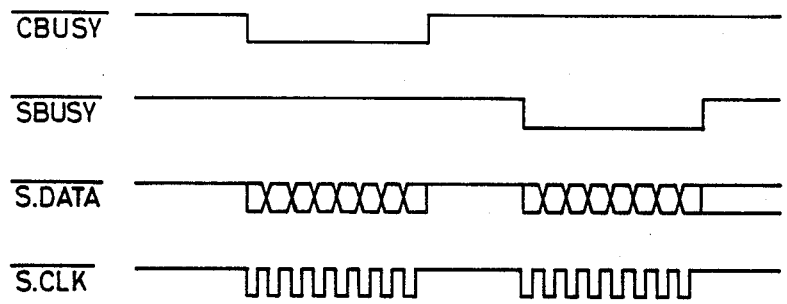

Now reference is made to FIGS. 11 and 12 for explaining the timing of interface signals between the external unit and the reader unit.

In the following description, said external unit is composed, as an example, of a laser beam printer.

A beam detection signal BD corresponds to a start end signal of each main scanning line, and is used for synchronization with the polygon mirror scanner of the printer unit when it is connected.

An image signal VIDEO contains 4678 pixels of ca. 56 nsec. each, in a scanning line. It is released in synchronization with the beam detection signal BD when the reader is connected to the printer, or in synchronization with another pseudo-horizontal synchronization signal generated internally (hereinafter represented as HSYNC) in the transmission to other units.

A section signal VIDEO ENABLE corresponding to said 4678 pixels of the image signal, is released in synchronization with said signal BD or HSYNC.

A signal VSYNC indicates the image section in the sub scanning direction.

A signal PRINT REQUEST indicates that the sheet supply is enabled in the printer unit. In response the reader sends a sheet feed command by a signal PRINT, and releases the signals VSYNC and VIDEO after a time T1 to be determined in consideration of the image magnification, size of trimming area and amount of image movement.

Signals OHP and VTOP indicate the position of the optical system in the reader unit, and are respectively obtained from the sensors 313, 314 shown in FIG. 5. Signals BACK and FORWARD are supplied from the CPU 308 in FIG. 5 to the motor driver 311 for controlling the backward and forward motion of the optical system.

FIG. 12 shows communication signals S.DATA, S.CLK, CBUSY and SBUSY between the reader and the printer. The signals S.DATA and S.CLK are both 8-bit serial data and clock signals, and are bidirectional. The signal CBUSY is released when the reader releases the data and clock signal, while the signal SBUSY is released when the printer releases the data and clock signal.

FIG. 11 is a timing chart showing a copy start instruction and a copy stop instruction from the reader to the printer, as examples of serial communication.

Figure 14:
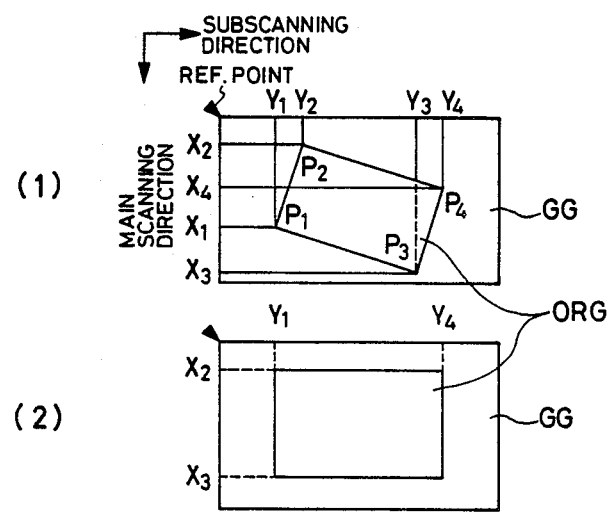
FIG. 14 is a schematic view showing the state of an original document on an original table.
Figure 13:
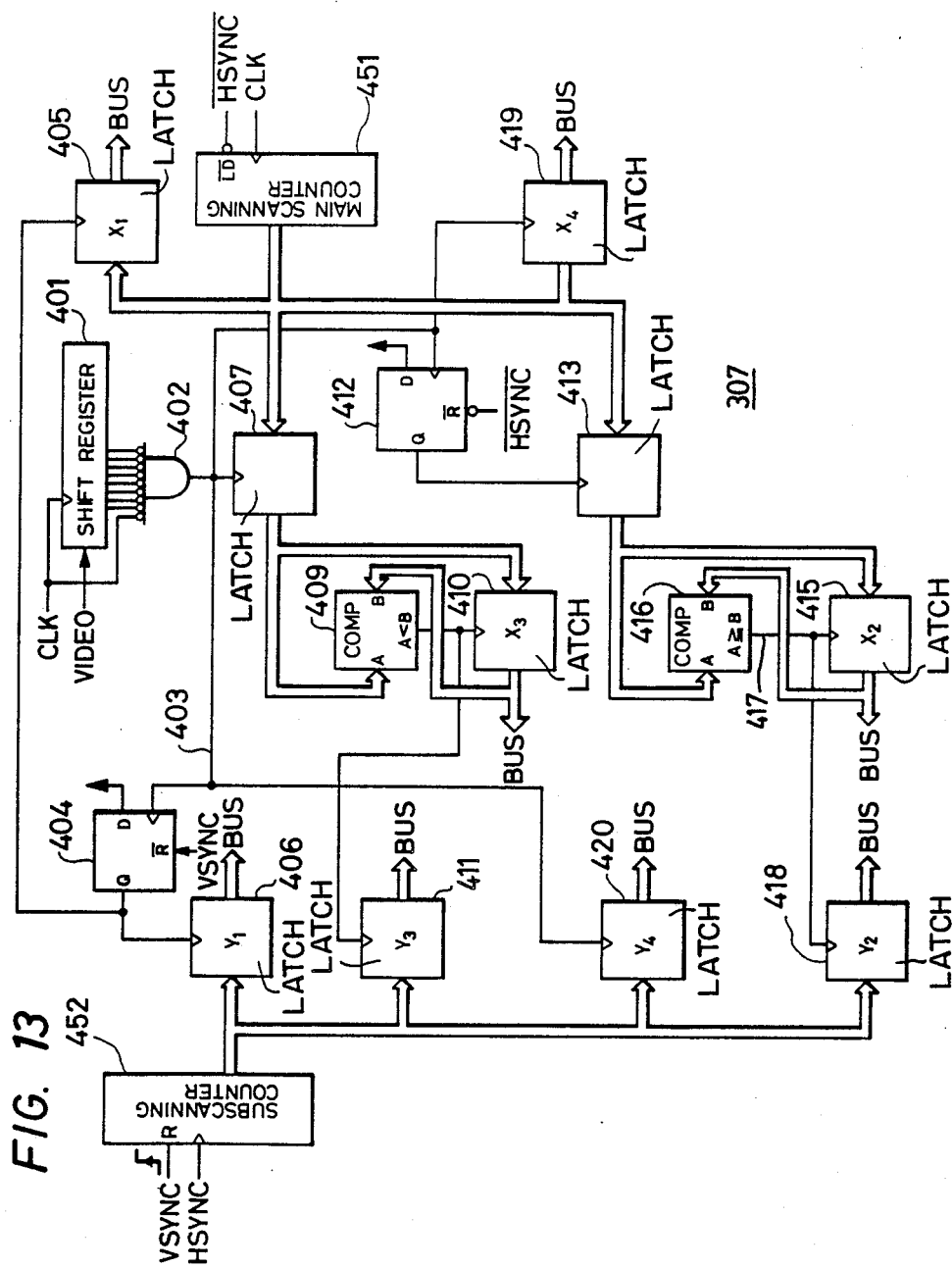
FIG. 13 is a circuit diagram of an original position detector.

FIG. 13 shows a circuit for coordinate detection in the original position detector 307 in FIG. 5, and FIG. 14 shows the state of an original document ORG placed on the original supporting glass GG.

A main scanning counter 451, composed of a down counter, indicates the scanning position in a main scanning line. Said counter 451 is set to a maximum value in the main scanning direction (X) by the horizontal synchronization signal HSYNC, and counts the image clock signals CLK downwards. A sub scanning counter 452, composed of an up counter, is reset to zero at the start of the image front end signal VSYNC, and counts the horizontal synchronization signals upwards, thus indicating the scanning position in the sub scanning direction.

A pre-scanning operation is executed for reading the entire area of the original support glass 3 prior to the original scanning operation, and the resulting image data VDO binarized and transmitted by a black-and-white inverting gate 909 are supplied, in the unit of 8 bits, into a shift register 401. Upon completion of the entry of said 8-bit data, a gate 402 discriminates whether all of said 8-bit data are white, and, if all white, releases a signal "1" to a signal line 403.

Thus, after the start of the pre-scanning operation, a flip-flop 404 is set by said signal "1" on the signal line 403 in response to the first appearance of 8-bit white signals. Said flip-flop 404 is reset in advance by the VSYNC signal, and, after setting as explained above, remains in the set state until it is reset by the next VSYNC signal.

In response to the setting of the flip-flop 404, the current value of the main scanning counter 451 is loaded in a latch flip-flop 405, corresponding to the coordinate $X_1$ shown in FIG. 14. Also the current value of the sub-scanning counter 452 is loaded in a latch 406, corresponding to the coordinate $Y_1$ in FIG. 14. In this manner the coordinates of a point $P_1(X_1, Y_1)$ can be determined.

In addition the value of the main scanning counter 451 is loaded in a latch 407 in response to every signal "1" on the signal line 403. When the value of the main scanning counter is loaded in the latch 407 in response to the first appearance of 8-bit white signals, a comparator 409 compares said value with the value of a latch 410 which is set to the maximum value in the X-direction in synchronization with the VSYNC signal.

If the value of the latch 407 is smaller, the value of the latch 407 is loaded in the latch 410, and the value of the sub-scanning counter 452 is loaded in a latch 411. These operations are completed before the next 8-bit signals are loaded in the shift register 401. Comparison of the data of the latches 407, 410 is repeated over the entire image area, whereby the latch 410 retains the minimum value in the X-direction, and the latch 411 retains the corresponding Y-coordinate. Since the main scanning counter 451 is a down counter, the minimum value in the X-direction corresponds to a farthest point from SP in the main scanning direction. Thus the coordinates of a point $P_3(X_3, Y_3)$ shown in FIG. 14 can be determined.

A flip-flop 412 is reset by the horizontal synchronization signal HSYNC, then set in response to the first appearance of 8-bit white signals in each main scanning line, and retains the set state until the next HSYNC signal. In response to the setting of the flip-flop 412, the value of the main scanning counter 451, corresponding to the position of the first white signal in a line, is loaded in a latch 413. Then a comparator 416 compares the thus latched value with the value of a latch 415, which is in advance loaded with the minimum value "0" in the X-direction in synchronization with the VSYNC signal.

If the value of the latch 415 is smaller than or equal to that of the latch 413, a signal 417 is activated to load the value of the latch 413 into the latch 415. These operations are conducted between two consecutive HSYNC signals.

The above-mentioned comparison is repeated over the entire image area, whereby the latch 415 retains the maximum value in the X-direction, corresponding to the X-coordinate of the white signal closest, in the X-direction, to the scanning start position, namely $X_2$ in FIG. 14. Also in response to the activation of the signal line 417, the value of the sub-scanning counter is loaded in a latch 418, corresponding to $Y_2$ in FIG. 14. In this manner the coordinates of a point $P_2(X_2, Y_2)$ can be determined.

Also the values of the main scanning counter 451 and the sub scanning counter 452 are respectively loaded in latches 419, 420 in response to the every appearance of 8-bit white signals over the entire image area.

Consequently, at the end of the pre-scanning operation, said latches 419, 420 retain the count values when the 8-bit white signals appeared the last time. In this manner the coordinates of a point $P_4(X_4, Y_4)$ can be determined.

The data lines of the above-mentioned eight latches 406, 411, 420, 418, 405, 410, 415 and 419 are connected to a bus line BUS of the CPU 308 shown in FIG. 5, so that the CPU 308 reads these data at the end of the pre-scanning operation.

In this manner the CPU 308 obtains the coordinates of four corners of the original document placed on the original support glass 3, thus recognizing the position and size of said original document. Also the state of inclination of the original document may be recognized.

Though FIG. 14(1) shows the state of detecting the coordinates of four corners $P_1$, $P_2$, $P_3$ and $P_4$ of an original document placed in an inclined state, such state does not occur in practice. In fact the original document is placed parallel to a side of the original supporting glass, or in contact therewith, so that the coordinates $X_2$, $X_3$, $Y_1$ and $Y_4$ may be adopted as information indicating the position and size of the original document.

Figure 15:
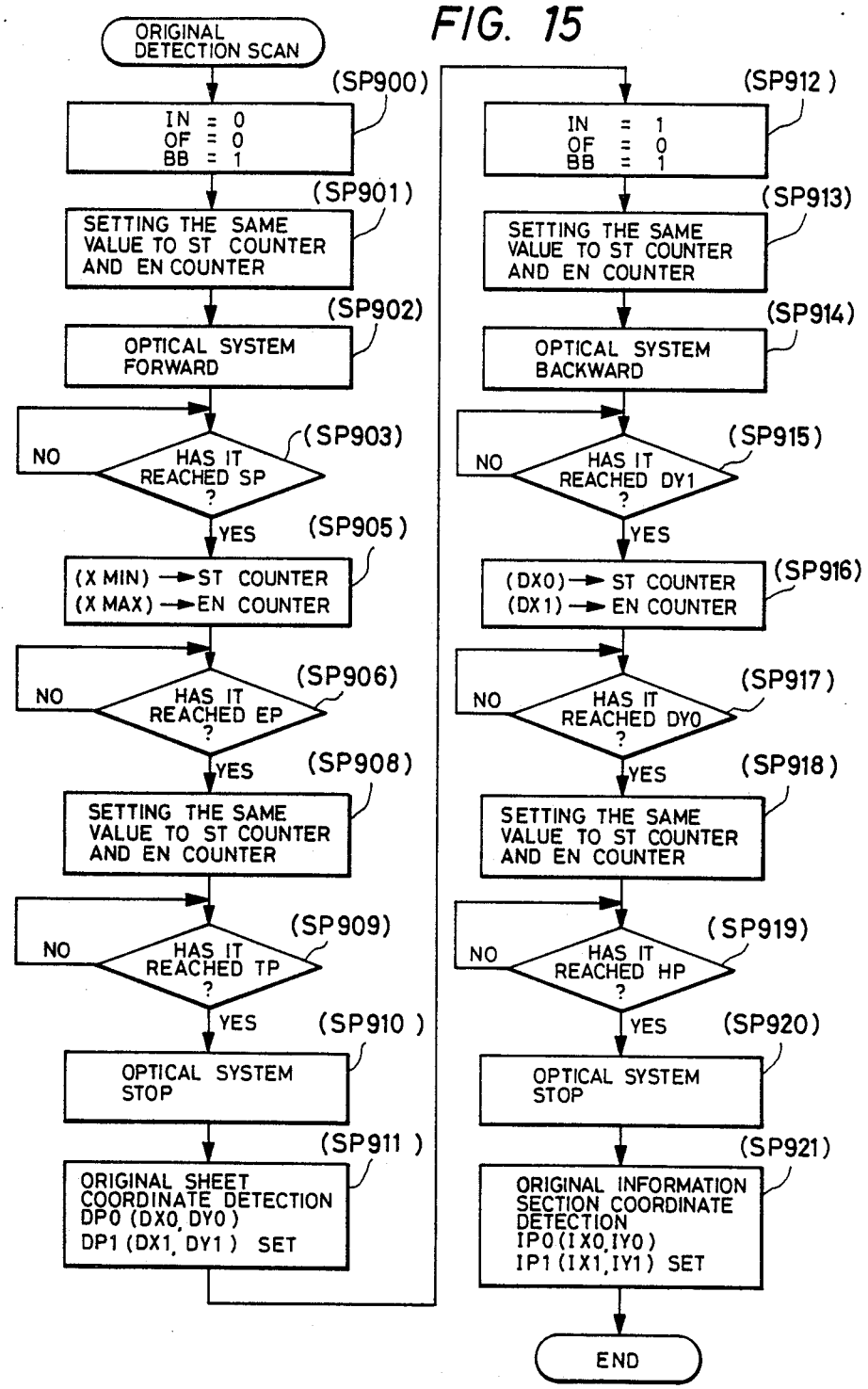
FIG. 15 is a flow chart of control sequence for coordinate detection.

Now reference is made to a flow chart in FIG. 15, for explaining the control sequence of the scanning operation by the CPU 308 for detecting the coordinates of the original.

Figure 16:
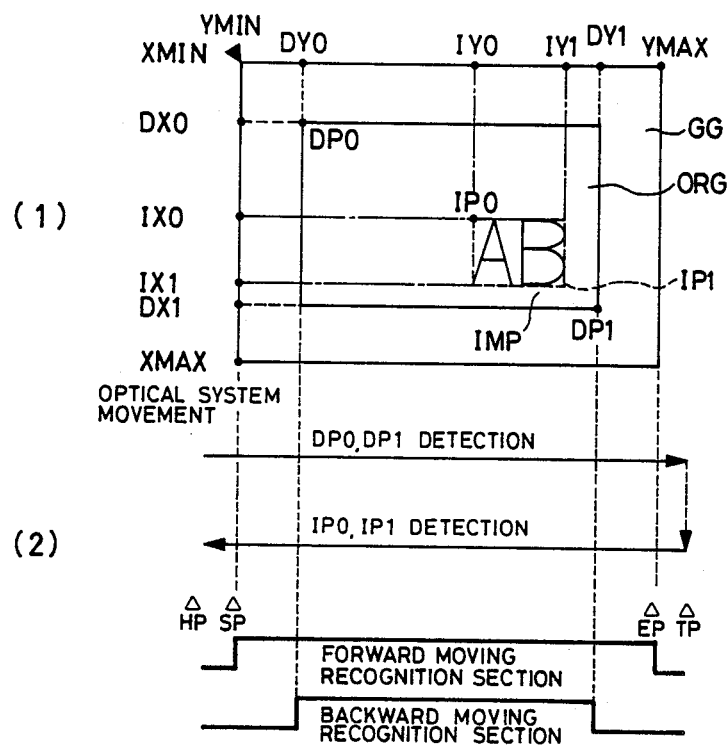
FIG. 16 is a schematic view showing the principle of coordinate detection.

FIG. 16(1) shows an example of the original document ORG to be read, which has character information IMP only in the lower right corner portion.

At first three control signals shown in FIG. 6 are set at a state IN =0, OF =0 and BB =1 (step SP900), and the ST-counter 912 and EN-counter 913 both for trimming are set to a same value, for example "0" (step SP901). Thus the VIDEO signal supplied to the coordinate detecting logic circuit becomes always black.

Then the forward motion of the optical system is initiated for the pre-scanning operation (SP902), and, upon arrival at the position SP in FIG. 16(2) (SP903), the values corresponding to XMIN and XMAX shown in FIG. 16(1) are respectively set in the ST-counter 912 and EN-counter 913 (SP905).

Said values XMIN and XMAX indicate the area of the original support glass GG, or the readable main scanning area. In this state the VIDEO signal reflects the black and white states of the image information inside the original supporting glass GG. Consequently an area inside said glass GG but outside the original document ORG appears as black due to the mirror-finish face of the original cover, while the background area of said original appears as white, and the information area thereon appears as black.

This control is continued to the position EP in FIG. 16(2), or the right-end position of the original supporting glass (SP906), and then a same value is again set in the ST and EN-counters 912, 913 (SP908) thereby shifting the VIDEO signal to black after said point EP.

Upon arrival at a position TP, or the reversing position, the optical system is stopped (SP909, SP910).

FIG. 17(1) shows the image read in these operations, wherein a hatched area SSP, representing an area outside trimming, is forcibly changed to black by the signal BB =1, while a black area KNP, representing an area inside trimming, is observed as black in image reading. In this area, white information appears first and last in the main and sub scanning directions at DX0, DX1, DY0 and DY1, representing the coordinates of the original document ORG.

Upon arrival of the optical system at TP, these coordinates are stored in the latches of the original position detecting unit in FIG. 13, and are set in a RAM area of the CPU 308 (SP911). Then there is initiated a coordinate detecting operation for the information portion IMP in the original ORG.

At first signals are set as IN =1, OF =0 and BB =1 (SP912) so as to invert the VIDEO signal inside the trimming area and to shift the VIDEO signal to black outside said trimming area. At first a same value is set in the ST-counter 912 and the EN-counter 913 (SP913), and the backward motion of the optical system is initiated (SP914).

When the optical system reaches the right-end position DY1 of the original ORG detected in the forward motion (SP915), the ST-counter 912 is loaded with a coordinate DX0 of the original ORG closer to the reference point, and the EN-counter 913 is loaded with a coordinate DX1 further from said reference point (SP916).

Through this control, the VIDEO signal thereafter is inverted inside the original ORG but is always black outside the original ORG. This control is continued to the left-end position DY0 of the original, and, upon arrival at said position (SP917), a same value is again set in the ST-counter 912 and EN-counter 913 thereby shifting the VIDEO signal to black (SP918). Subsequently, upon arrival at the position HP (SP919), the optical system is stopped (SP920).

FIG. 17(2) shows the VIDEO signal in the backward motion, wherein a hatched area SCP is forcedly changed to black, while a black area BNP corresponds to the background area of the original ORG and is black due to signal inversion, and the information portion IMP appears white.

Consequently the original position detecting unit shown in FIG. 13 detects the coordinates IX0, IX1, IY0 and IY1 of the information portion IMP as shown in FIG. 17(2), and sets said coordinates in a RAM area of the CPU 308.

The distances between HP and SP, and between EP and TP shown in FIG. 16(2) are determined for accelerating the optical system to a constant speed by the phaselocked loop control. Also, the distance between EP and DY1, and between DY0 and SP used in the backward motion can be known from the detection of DY0 and DY1 in the forward motion. Also the time required for moving the distance between EP and SP can be known since the optical system travels said distance with a constant speed. In this manner the control explained in relation to FIG. 15 is rendered possible.

As explained in the foregoing, it is rendered possible to detect the coordinates of the position of the original document in the forward movement of the optical system, and to detect the coordinates of the position of the information portion in the original document, based on the results obtained in the forward movement.

Consequently, based of the information on position of the information portion in the original document, the CPU 308 can know the position of said information portion on the original supporting glass, and the size of said information portion. It is therefore possible to extract the information portion only and to effectively remove noise on the edges of the original, by setting the ST- and EN-counters 912, 913 according to the abovementioned information and effecting the original reading in this state. It is also possible to record the image on a recording material of a size matching the size of the information portion, by determining the size of said information portion from the above-mentioned information on positions and accordingly selecting the recording material in the printer. It is furthermore possible, for example, o place the information portion in a suitable position, for example center, of the recording material, by controlling the amount of image movement by the trimming process unit 306 according to said information.

Also in case of storing the read image data in an electronic file or transmitting said data as in a facsimile apparatus, it is rendered possible to store or transmit the information portion only, after removing unnecessary marginal area according to the abovementioned information on the position of the image information, thereby enabling efficient utilization of the electronic file and improvement in transmission efficiency.

Figure 18:
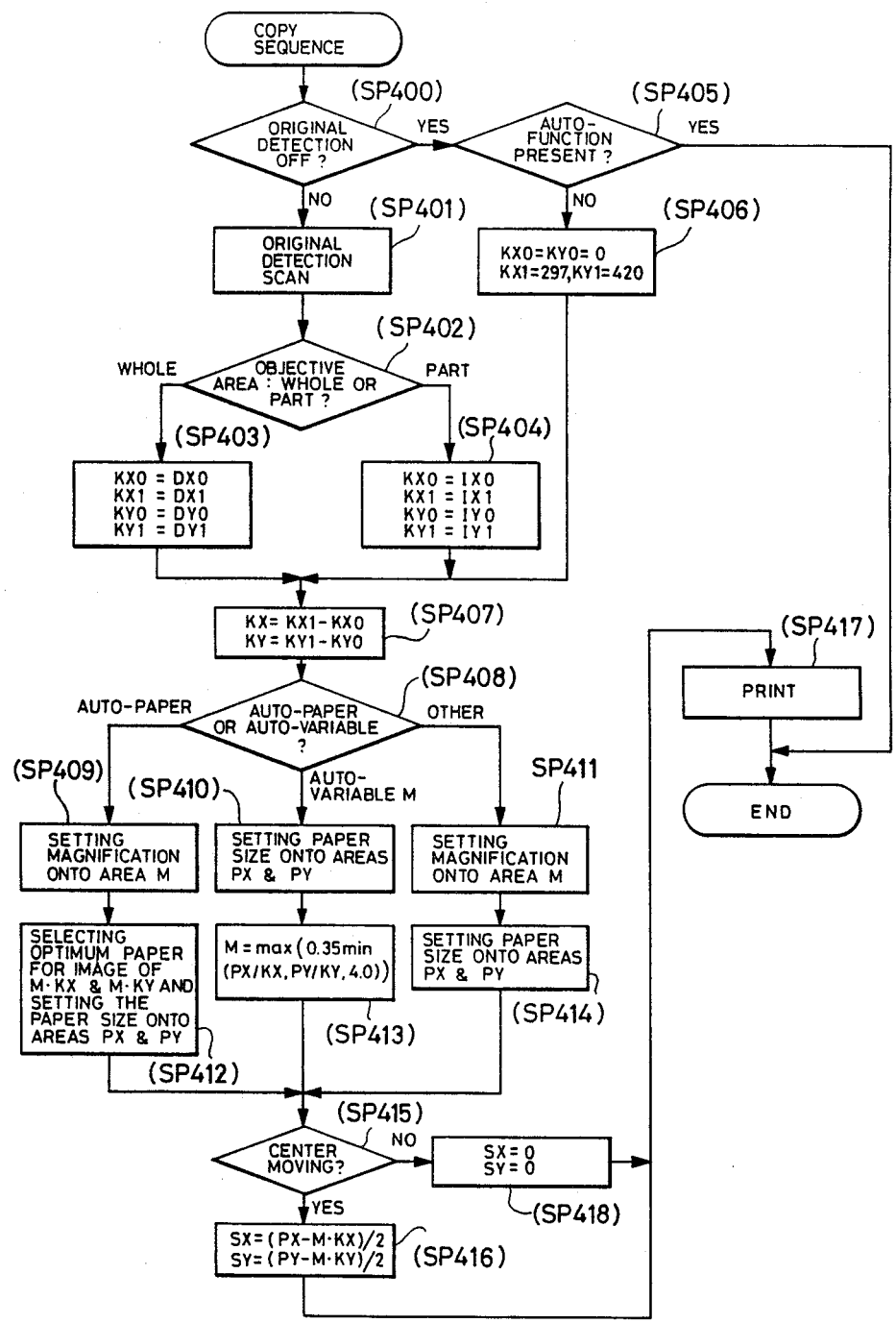
FIG. 18 is a flow chart of a control sequence.

Now reference is made to a flow chart in FIG. 18, for explaining an editing sequence performed by the CPU 308.

If the original detecting function is turned off by the key 115 (SP400), it is determined whether at least one of automatic functions, (which are automatic sheet selection, automatic image size variation and automatic centering) is selected (SP405). If such a function is selected, the sequence is terminated since such an automatic function is not executable in this state. On the other hand, if such automatic functions are not selected, the maximum readable size (A3) is taken as the reading area, and KX0 =0, KX1 =297, KY0 =0 and KY1 =420 corresponding to said A# size are stored in a RAM area (SP406), and the sequence proceeds to a step SP407.

If the original detecting function is turned on in the step SP400, the aforementioned original detecting operation is conducted (SP401).

Then according to the mode selected by the key 115 (SP402), the coordinates KX0, KX1, KY0, KY1 are loaded with coordinate data DX0, DX1, DY0, DY1 of the original (SP403) or coordinate data IX0, IX1, IY0, IY1 of the information portion (SP404). Then KX =KX1 = KX0 and KY =KY1 − KY0 are set as the reading size in a RAM area (SP407).

In the automatic sheet selection mode (SP408) as the image magnification is selected by the operator and is already known, the image magnification shown on the display device 112 is set in a RAM area (SP409). Then a sheet size, capable of accommodating the image defined by M × KX and M × KY wherein M is the image magnification, is selected from the upper or lower cassette of the printer, and the data of the thus selected sheet size are stored in RAM areas PX, PY (SP412).

In the automatic image size variation mode (SP408), the sheet size, set by the operator, is set in the RAM areas PX, PY (SP410), and the image magnification M is calculated from said sheet size (SP413).

Said step SP413 calculates in such a manner that the smaller of the main scanning image magnification PX/KX and the sub scanning image magnification PY/KY falls within a range from 35% to 400%.

If neither the automatic sheet selection nor the automatic image size variation is selected (SP408), the image magnification and the sheet size are selected by the operator and are therefore known. Thus the image magnification and the sheet size are set in the RAM areas M, PX and PY (SP411, SP414).

If the centering mode is selected (SP415), the amount of the peripheral margins is calculated for the aforementioned image movement (SP416), and the obtained results are set in RAM areas SX, SY. If centering is not selected (SP415), SX =SY =0 is likewise set (SP418).

When these data are obtained, the original image is read, and the aforementioned processes of trimming, image movement, and image size variation are conducted, and, if necessary, the obtained image is printed (SP417).

Figure 19:
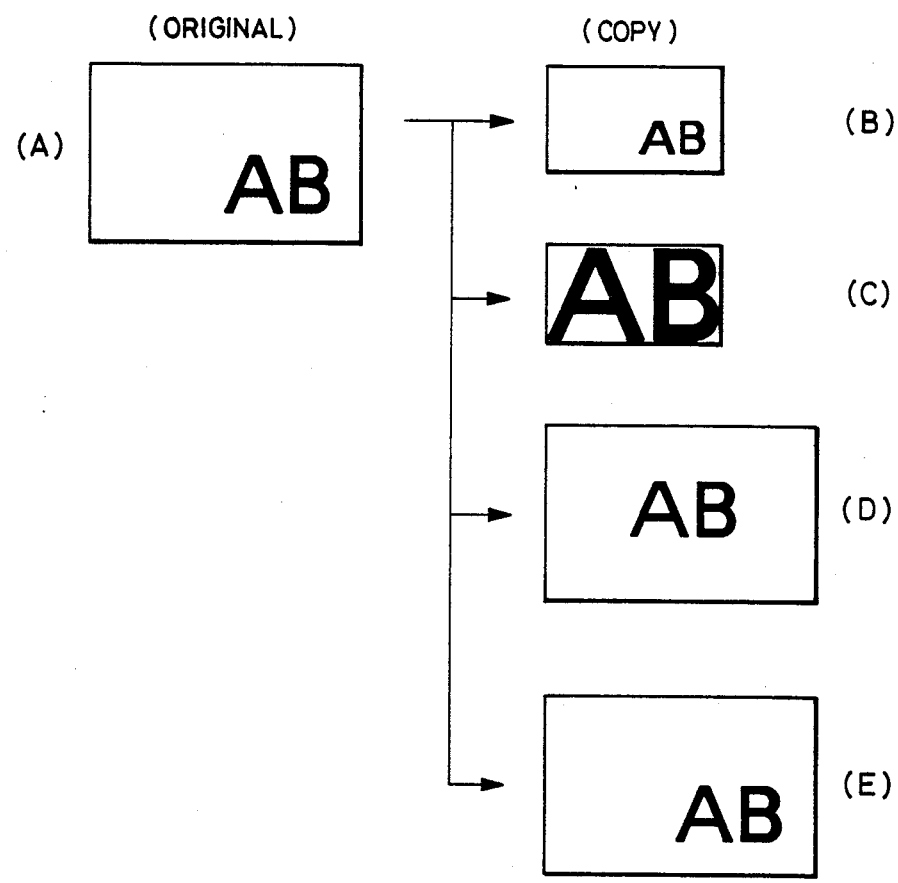
FIG. 19 is a schematic view showing examples of image editing.

FIG. 19 shows an example of image editing by the above-explained procedure.

An original (A) may be reduced to (B) by automatic image size variation in a "whole" mode, or enlargement of the information portion only can be obtained as in (C) by automatic image size variation in a "part" mode on a same sheet.

Also if the original (A) is subjected to centering on a same-sized sheet, the "part" mode provides an image (D) while the "whole" mode provides an image (E) identical with the original.

As explained in the foregoing, various practical editing functions can be achieved with simple operations.

The foregoing embodiment is limited to an apparatus in which the image signal is obtained by photoelectrically reading an image, but the present invention is applicable also to a copying machine in which image formation is achieved by projecting an original image directly onto a photosensitive member.

As explained in the foregoing, the present invention allows for the automatic detection of not only the original but also the information portion therein, and allows for image processing on said information portion.

Though the present invention has been explained by a preferred embodiment thereof, it is not limited to such embodiment but is subject to various modifications within the scope and spirit of the appended claims.

I claim:

1. An image processing apparatus comprising:
   an original supporting table for supporting an original, the original having an information portion and a non-information portion;
   reading means for reading an area of said table including an area on which the original is placed, and for generating image data corresponding to the read area;
   first detector means for detecting the position of the original on said table based on image data from said reading means; and
   second detector means for detecting the position or the size of the information portion of the original based on image data from said reading means.

2. An image processing apparatus according to claim 1, wherein the position of the original is detected by said first detector means based on image data from the reading means generated during a first reading of the area of the table, and wherein the position or size of the information portion is detected by said second detector means based on image data from the reading means generated during a second reading of the area of the table.

3. An image processing apparatus according to claim 1, further comprising process means for processing image data from said reading means, based on the result of the detection by said second detector means.

4. An image processing apparatus comprising:
an original supporting table for supporting an original, said original having an information portion and a non-information portion;
reading means for reading an area of the table including and area on which the original is placed and for generating image data corresponding to the read area;
first detector means for detecting the position or size of the original on said table based on image data from said reading means;
second detector means for detecting the position or size of the information portion of said original based on image data from said reading means; and
process means for processing image data from said reading means based on either the result of the detection by said first detector means or the result of the detection by said second detector means.

5. An image processing apparatus according to claim 4, further comprising selector means for selecting whether the process means is to process image data from the reading means based on the result of the detection by the first detector means.

6. An image processing apparatus according to claim 4, wherein said second detector means detects the position or size of the information portion based on image data from th reading means and the result of the detection by said first detector means.

7. An image processing apparatus comprising:
an original supporting table for supporting an original, said original having an information portion and non-information portion;
reading means for reading an area of said table including an area on which the original is placed, and for generating image data corresponding to the read area;
detector means for detecting the position or size of the information portion of said original based on image data from said reading means; and
process means for processing image data corresponding to the information portion of the original based on the result of the detection by said detector means.

8. An image processing apparatus according to claim 7, wherein said process means is adapted to extract the image data corresponding to the information portion of the original from image data from said reading means.

9. An image processing apparatus according to claim 7, wherein said process means is adapted to perform a variable magnification processing of the image data corresponding to the information portion of the original.

* * * * *

UNITED STATES PATENT AND TRADEMARK OFFICE
CERTIFICATE OF CORRECTION

PATENT NO. : 4,899,227

DATED : February 6, 1990

INVENTOR(S) : Masanori YAMADA

It is certified that error appears in the above-identified patent and that said Letters Patent is hereby corrected as shown below:

COLUMN 1:

Line 32, "U.S. Pat. 4,686,577." should read --U.S. Pat. No. 4,686,577.--; and

Line 64, "cessings" should read --cessing-- .

COLUMN 2:

Line 16 "FIG. 13" should begin a new paragraph; and

Line 59, "$(=10^{6/180} \times 25.4/400)$" should read --$(10^6/180 \times 25.4/400)$--.

COLUMN 3:

Line 39, "flush" should read --flash--.

COLUMN 5:

Line 13, "shaft memory" should read --shift memory--.

UNITED STATES PATENT AND TRADEMARK OFFICE
CERTIFICATE OF CORRECTION

PATENT NO. : 4,899,227

DATED : February 6, 1990

INVENTOR(S) : Masanori YAMADA

It is certified that error appears in the above-identified patent and that said Letters Patent is hereby corrected as shown below:

COLUMN 6:

Line 5, ""sub scanning" should read --sub-scanning--;

Line 9, "phaselocked" should read --phase-locked--;

Line 30, "output clock signal VLCK" should read --output clock signal VCLK--; and Line 50, "sub scanning should read --sub-scanning--.

COLUMN 7:

Lines 4-7, should not be italicized; and

Line 36, "sub scanning" should read --sub-scanning--.

COLUMN 8:

Line 3, "sub scanning" should read --sub-scanning--; and

Line 7, "sub scanning" should read --sub-scanning--;

UNITED STATES PATENT AND TRADEMARK OFFICE
CERTIFICATE OF CORRECTION

PATENT NO. : 4,899,227

DATED : February 6, 1990

INVENTOR(S) : Masanori YAMADA

It is certified that error appears in the above-identified patent and that said Letters Patent is hereby corrected as shown below:

COLUMN 9:

Line 14, "sub scanning" should read --sub-scanning--.

COLUMN 10:

Line 14, "sub scanning" should read --sub-scanning--; and line 61, "phaselocked" should read --phase-locked--.

COLUMN 11:

Line 7, "of the information on" should read --on the information of the--;

Line 22, "o" should read --to--; and

Line 31, "area" should read --areas--; and "abovementioned" should read --above-mentioned--; and Line 60, "(SP408) as" should read --(SP408), as--.

UNITED STATES PATENT AND TRADEMARK OFFICE
CERTIFICATE OF CORRECTION

PATENT NO. : 4,899,227

DATED : February 6, 1990

INVENTOR(S) : Masanori YAMADA

It is certified that error appears in the above-identified patent and that said Letters Patent is hereby corrected as shown below:

COLUMN 12:

Line 7, "sub scanning" should read --sub-scanning--.

COLUMN 13:

Line 10, "means," should read --means--; and

Line 17, "placed" should read --placed,--.

COLUMN 14:

Line 6, "th" should read --the--; and

Line 11, "non-information" should read --a non-information--.

Signed and Sealed this

Fifteenth Day of September, 1992

Attest:

DOUGLAS B. COMER

*Attesting Officer*  *Acting Commissioner of Patents and Trademarks*